US010082203B2

(12) United States Patent
Muldoon

(10) Patent No.: US 10,082,203 B2
(45) Date of Patent: Sep. 25, 2018

(54) LOW-COST EPICYCLIC GEAR CARRIER AND METHOD OF MAKING THE SAME

(71) Applicant: UNITED TECHNOLOGIES CORPORATION, Farmington, CT (US)

(72) Inventor: Marc J. Muldoon, Marlborough, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 320 days.

(21) Appl. No.: 15/160,881

(22) Filed: May 20, 2016

(65) Prior Publication Data

US 2017/0335946 A1 Nov. 23, 2017

(51) Int. Cl.
*F16H 57/08* (2006.01)
*F02K 3/04* (2006.01)

(52) U.S. Cl.
CPC .............. *F16H 57/082* (2013.01); *F02K 3/04* (2013.01); *F05D 2220/36* (2013.01); *F05D 2260/40311* (2013.01)

(58) Field of Classification Search
CPC ...................... F05D 2260/40311; F16H 57/082
See application file for complete search history.

(56) References Cited

U.S. PATENT DOCUMENTS

| | | | | |
|---|---|---|---|---|
| 5,984,527 A | * | 11/1999 | Kober | F16B 5/025 384/192 |
| 8,939,714 B1 | * | 1/2015 | McCune | F16H 57/082 415/122.1 |
| 9,874,150 B2 | * | 1/2018 | McCune | F02C 7/36 |
| 9,874,274 B2 | * | 1/2018 | Sheridan | F16H 57/0427 |
| 2004/0259679 A1 | * | 12/2004 | Becquerelle | F16H 1/2827 475/331 |
| 2013/0319011 A1 | * | 12/2013 | Pescosolido | F16H 57/082 60/805 |
| 2016/0025187 A1 | * | 1/2016 | Stoakes | F16H 57/082 475/331 |

FOREIGN PATENT DOCUMENTS

| | | |
|---|---|---|
| EP | 2317176 A1 | 5/2011 |
| JP | H01121747 | 8/1989 |
| WO | WO2014123704 A1 | 8/2014 |

OTHER PUBLICATIONS

Extended European Search Report dated Nov. 27, 2017 in Application No. 17171974.3.

* cited by examiner

*Primary Examiner* — Tisha D Lewis

(57) ABSTRACT

A gear carrier includes a first end plate. The gear carrier also includes a connector plate connected to the first end plate. The gear carrier also includes a second end plate. The gear carrier also includes a bushing configured to extend through the second end plate and into the connector plate to connect the second end plate to the connector plate.

18 Claims, 7 Drawing Sheets

LOW-COST EPICYCLIC GEAR CARRIER AND METHOD OF MAKING THE SAME

FIELD

The present disclosure is directed to a gear carrier for use with an epicyclic gear system and, more particularly, to a gear carrier having at least two components coupled using bushings.

BACKGROUND

Gas turbine engines, such as those that power modern commercial and military aircraft, may include a fan section to propel the aircraft, a compressor section to pressurize a supply of air from the fan section, a combustor section to burn fuel in the presence of the pressurized air, and a turbine section to extract energy from the resultant combustion gases and to generate thrust.

The fan section may receive torque generated by the turbine section in response to the turbine section extracting the energy. It may be desirable for the torque received by the fan section to have a different angular velocity than the torque generated by the turbine section. Accordingly, some gas turbine engines may include a gear assembly for changing the angular velocity of torque delivered to the fan section from the turbine section.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Disclosed herein is a gear carrier. The gear carrier includes a first end plate. The gear carrier also includes a connector plate connected to the first end plate. The gear carrier also includes a second end plate. The gear carrier also includes a bushing configured to extend through the second end plate and into the connector plate to connect the second end plate to the connector plate.

Any of the foregoing gear carriers may also include a second bushing configured to extend through the first end plate and into the connector plate to connect the first end plate to the connector plate.

In any of the foregoing gear carriers, the bushing has a first end that defines a collar and a second end that defines a chamfer.

In any of the foregoing gear carriers, the first end plate defines a collar cavity configured to receive the collar of the bushing.

Any of the foregoing gear carriers may also include a bolt configured to extend through a bolt aperture of the bushing and be received by a bolt terminal of the connector plate for resisting movement of the bushing relative to the second end plate and the connector plate.

In any of the foregoing gear carriers, the bushing extends for between about 0.25 inches and about 0.75 inches through the first end plate and extends for between about 0.25 inches and about 0.75 inches into the connector plate.

In any of the foregoing gear carriers, the gear carrier is configured to be used in a gas turbine engine.

In any of the foregoing gear carriers, the bushing includes at least one of titanium or steel.

Also described is a method for forming a gear carrier. The method includes forming a first end plate and forming a cylinder. The method also includes forming a second end plate and a connector plate from the cylinder. The method also includes connecting the first end plate to the connector plate by inserting a bushing through an end bushing aperture of the first end plate and a connector bushing aperture of the connector plate.

In any of the foregoing methods, forming the first end plate and forming the second end plate and the connector plate include machining various tolerance surfaces.

In any of the foregoing methods, forming the first end plate and forming the second end plate and the connector plate include at least one of casting or forging the first end plate and the second end plate and the connector plate.

In any of the foregoing methods, connecting the first end plate to the connector plate using the bushing includes increasing a temperature of the first end plate and the connector plate, decreasing a temperature of the bushing, and inserting the bushing into the end bushing aperture of the first end plate and the connector bushing aperture of the connector plate.

Any of the foregoing methods may also include machining any remaining features of the gear carrier after the first end plate is connected to the connector plate.

Any of the foregoing methods may also include inserting a bolt through a bolt aperture of the bushing and screwing the bolt into a bolt terminal of the connector plate.

Also described is a method for forming a gear carrier. The method includes connecting a first end plate to a connector plate by inserting a first bushing through a first end bushing aperture of the first end plate and a first connector bushing aperture of the connector plate. The method also includes connecting a second end plate to the connector plate by inserting a second bushing through a second end bushing aperture of the second end plate and a second connector bushing aperture of the connector plate Any of the foregoing methods may also include forming the first end plate, forming the second end plate and forming the connector plate by machining various tolerance surfaces.

Any of the foregoing methods may also include forming the first end plate, forming the second end plate and forming the connector plate by at least one of casting or forging the first end plate, the second end plate and the connector plate.

In any of the foregoing methods, connecting the first end plate to the connector plate using the first bushing includes increasing a temperature of the first end plate and the connector plate, decreasing a temperature of the first bushing, and inserting the first bushing into the first end bushing aperture of the first end plate and the first connector bushing aperture of the connector plate.

Any of the foregoing methods may also include machining any remaining features of the gear carrier after the first end plate and the second end plate are connected to the connector plate.

Any of the foregoing methods may also include inserting a bolt through a bolt aperture of the first bushing and screwing the bolt into a bolt terminal of the connector plate.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
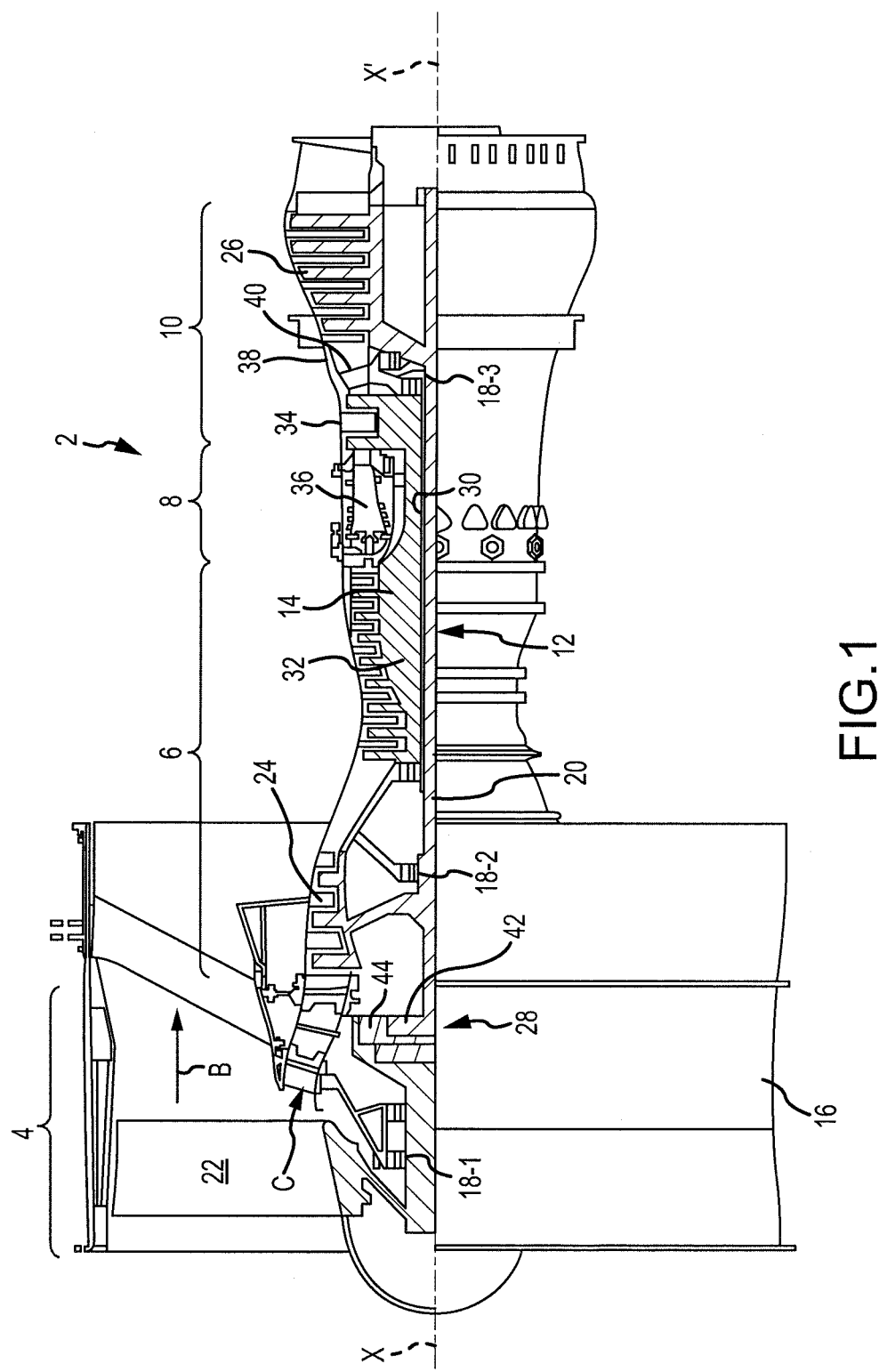
FIG. 1 is a schematic cross-section of a gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. An A-R-C axis is shown throughout the drawings to illustrate the axial, radial and circumferential directions.

In various embodiments and with reference to FIG. 1, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path B while compressor section 6 can drive air along a core flow-path C for compression and communication into combustor section 8 then expansion through turbine section 10. Although depicted as a two-spool turbofan gas turbine engine 2 herein, it should be understood that the concepts described herein are not limited to use with two-spool turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a first turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbine sections 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly greater than that of the low pressure compressor section 24, and the low pressure turbine section 26 may have a pressure ratio that is greater than about 5:1. The pressure ratio of low pressure turbine section 26 may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal loads that are higher than thermal loads conventionally encountered, which may shorten the operational life of current components. In various embodiments, operating conditions in high pressure compressor section 32 may be approximately 1400 degrees Fahrenheit (1400° F., approximately 760° C.) or greater, and operating conditions in combustor 36 may be higher.

In various embodiments, combustor section 8 may comprise one or more combustor 36. As mentioned, the core airflow C may be compressed, then mixed with fuel and ignited in the combustor 36 to produce high speed exhaust gases.

Figure 2:
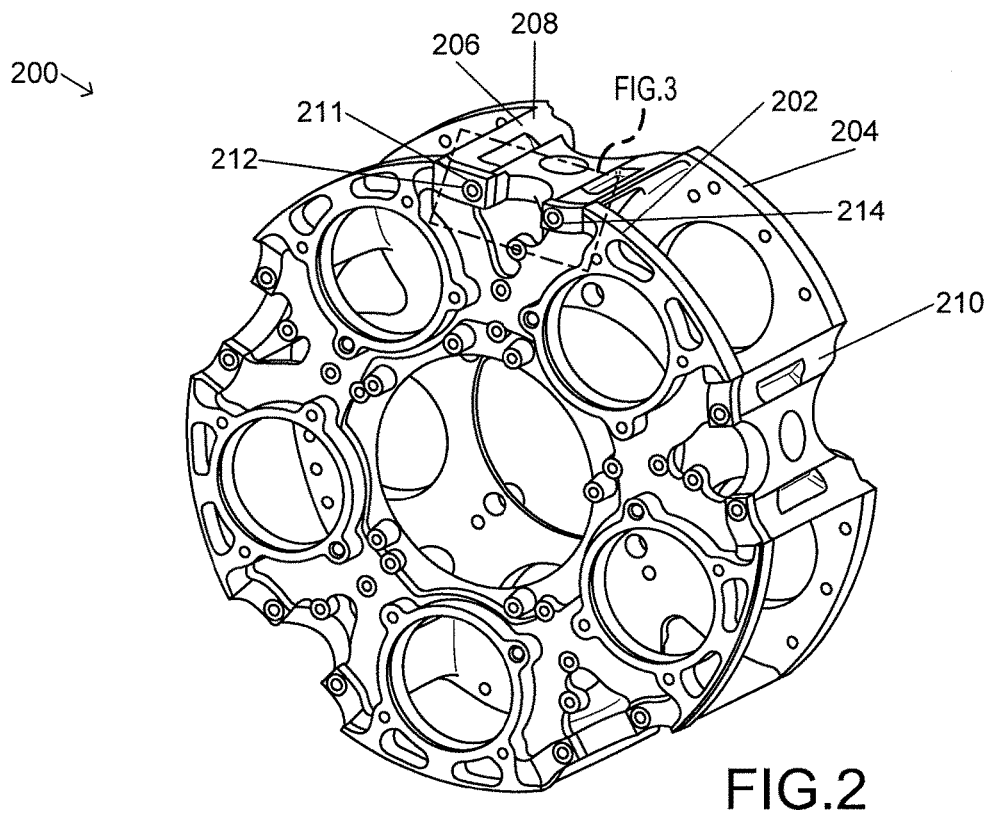
FIG. 2 is a view of a gear carrier for use in a gas turbine engine, in accordance with various embodiments.

Turning now to FIG. 2, a gear carrier 200 may be used in gear assembly 42 of gas turbine engine 2 of FIG. 1. Gear carrier 200 includes a first end plate 202, a second end plate 204 and a plurality of connector plates 206 including a first connector plate 208 and a second connector plate 210. Gear carrier 200 may also include a plurality of bushings 211 for connecting first end plate 202 to plurality of connector plates 206.

Figure 3:
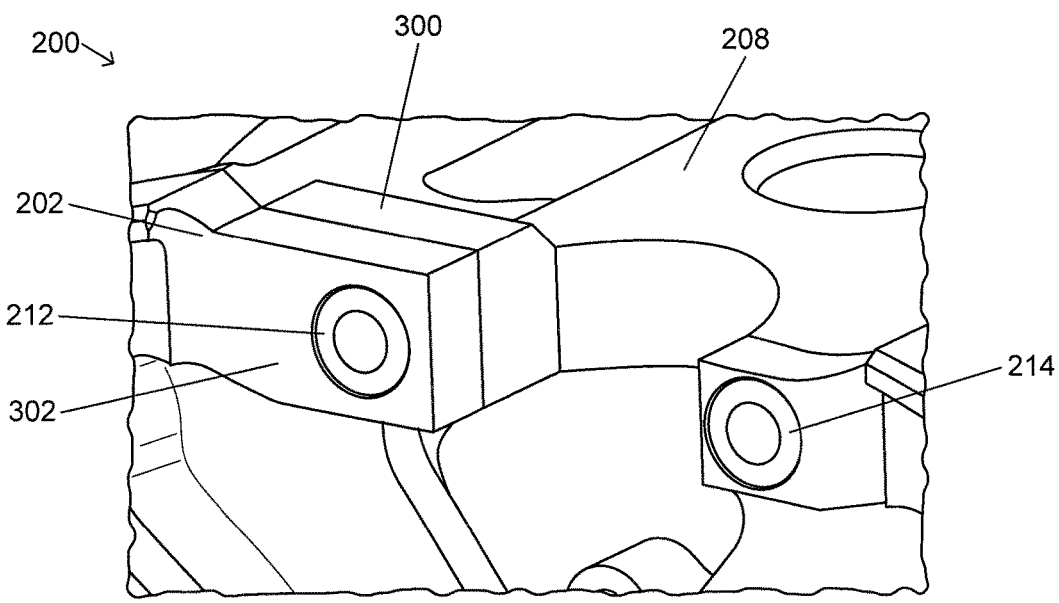
FIG. 3 is an enlarged view of a portion of the gear carrier shown in FIG. 2, in accordance with various embodiments.

Referring now to FIGS. 2 and 3, first end plate 202 may define an end plate connector tab 302. End plate connector tab 302 may include any structure sufficiently large to receive and provide support for first bushing 212. For example, end plate connector tab 302 may provide sufficient support to resist deformation of first end plate 202 due to force applied by first bushing 212 during use of gear carrier 200. First connector plate 208 may define a connector plate connector tab 300. As with end plate connector tab 302, connector plate connector tab 300 may include any structure sufficiently large to receive and provide support or first bushing 212. For example, connector plate connector tab 300 may provide sufficient support to resist deformation of first connector plate 208 due to force applied by first bushing 212 during use of gear carrier 200.

Conventional gear carriers included bolts connecting various components together. When a bolt is used to connect components, the components may move relative to each other due to tolerances of bolt apertures. For example, a bolt aperture may have a diameter of 0.39 inches (10 millimeters (mm) and a bolt may have a diameter of 0.34 inches (9.5 mm). Thus, the extra tolerance of the bolt aperture allows relative movement of the components. However, as will be described below, use of first bushing 212 and second bushing 214 may reduce or eliminate this tolerance and, thus, reduces relative movement of components as compared to use of bolts.

Figure 4A:
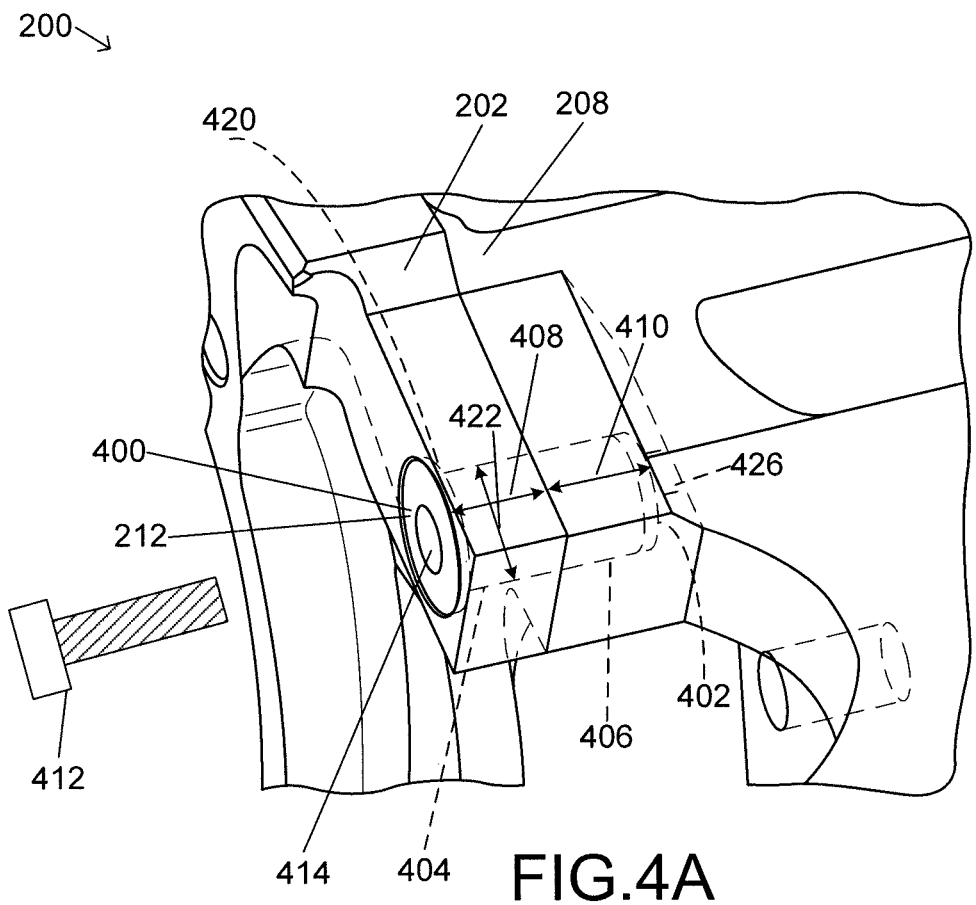
FIG. 4A is a perspective view of a portion of the gear carrier shown in FIG. 2 illustrating a bushing used to connect an end plate to a connector plate, in accordance with various embodiments.
Figure 4B:
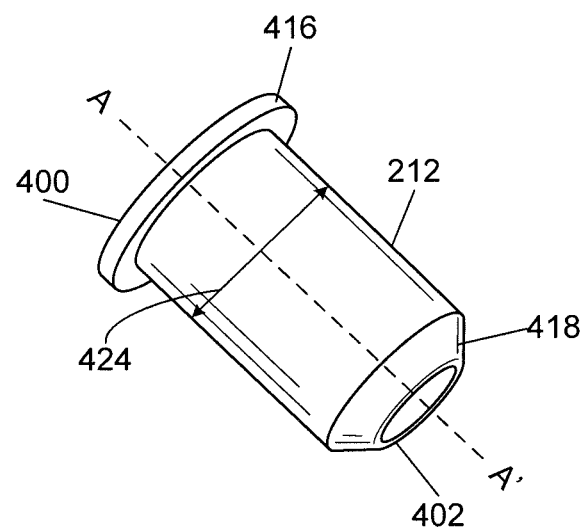
FIG. 4B is an enlarged view of the bushing shown in FIG. 4A, in accordance with various embodiments.

Turning now to FIGS. 4A and 4B, first end plate 202 may define an end bushing aperture 404 and first connector plate 208 may define a connector bushing aperture 406. End bushing aperture 404 and connector bushing aperture 406 may be designed to receive first bushing 212.

First bushing 212 may have an axis A-A', a first end 400, and a second end 402. First bushing 212 may have a collar 416 extending radially outward at first end 400. Collar 416 may reduce the likelihood of first bushing 212 being positioned farther into first end plate 202 than desired. Stated differently, collar 416 helps axially align first bushing 212 within end bushing aperture 404 and connector bushing aperture 406.

First bushing 212 may also have a chamfer 418 at second end 402. Chamfer 418 tapers towards second end 402. Chamfer 418 may increase the ease with which first bushing 212 may be received by end bushing aperture 404 and connector bushing aperture 406. Because chamfer 418 tapers to a smaller diameter at second end 402, second end 402 may be received by end bushing aperture 404 with relative ease.

End bushing aperture 404 may have a distance 408 in the direction of axis A-A'. In various embodiments, distance 408 may be between 0.25 inches and 0.75 inches (6.35 millimeters and 19.1 millimeters), such as between 0.4 inches and 0.6 inches (10.16 mm and 15.24 mm), or about 0.5 inches (12.7 mm). Where used in this context, "about" refers to the value plus or minus 10 percent of the value. Likewise, connector bushing aperture 406 may have a distance 410 in the direction of axis A-A'. In various embodiments, distance 410 may be between 0.25 inches and 0.75 inches (6.35 mm and 19.1 mm), such as between 0.4 inches and 0.6 inches (10.16 mm and 15.24 mm), or about 0.5 inches (12.7 mm). Thus, first bushing may extend for a distance between 0.25 inches and 0.75 inches (6.35 millimeters and 19.1 millimeters) through first end plate 202 and may extend for a distance between 0.25 inches and 0.75 inches (6.35 millimeters and 19.1 millimeters) through first connector plate 208.

End bushing aperture 404 and connector bushing aperture 406 may have a distance 422 in a direction perpendicular to distance 408 and distance 410. First bushing 212 may have a distance 424 that is parallel to distance 422 of end bushing aperture 404 and connector bushing aperture 406. In various embodiments, distance 424 may be greater than distance 422. In order to couple first end plate 202 to first connector plate 208 using first bushing 212, first end plate 202 and first connector plate 208 may be heated (i.e., a temperature of first end plate 202 and first connector plate 208 may be increased) and first bushing 212 may be cooled (i.e., a temperature of first bushing 212 may be reduced). This change in temperature results in distance 422 increasing and distance 424 decreasing. Before the temperatures return to equilibrium, first bushing 212 may be inserted into end bushing aperture 404 and connector bushing aperture 406. As the temperatures of first end plate 202, first connector plate 208 and first bushing 212 return to equilibrium, distance 424 may increase while distance 422 decreases. Thus, first bushing 212 may entirely fill end bushing aperture 404 and connector bushing aperture 406 such that no space is present between first bushing 212 and either of end bushing aperture 404 or connector bushing aperture 406.

First end plate 202 may define a collar cavity 420. Collar 416 may be received by collar cavity 420 such that collar 416 is unlikely to extend into an area not defined by first end plate 202.

First bushing 212 may define a bolt aperture 414 extending along the axis A-A'. First connector plate 208 may define a bolt terminal 426. In various embodiments, bolt terminal 426 may define or include screw threading. In that regard, after first bushing 212 is received by first end plate 202 and first connector plate 208, a bolt 412 may be inserted through bolt aperture 414. Bolt 412 may also be received by bolt terminal 426 and fastened to first connector plate 208 via bolt terminal 426. In that regard, bolt 412 may reduce the likelihood of first bushing 212 becoming separated from the first end plate 202 and/or first connector plate 208.

In various embodiments, first end plate 202 and first connector plate 208 may include titanium, steel, aluminum or the like. In various embodiments, first bushing 212 may include titanium or steel. In various embodiments, first bushing 212 may be exposed to relatively great pressures. Thus, it is desirable for the material of the first bushing 212 to be able to resist pressures at operating conditions. In that regard, it may be desirable for first bushing 212 to include a material having a relatively high yield strength, such as steel.

Figure 5:
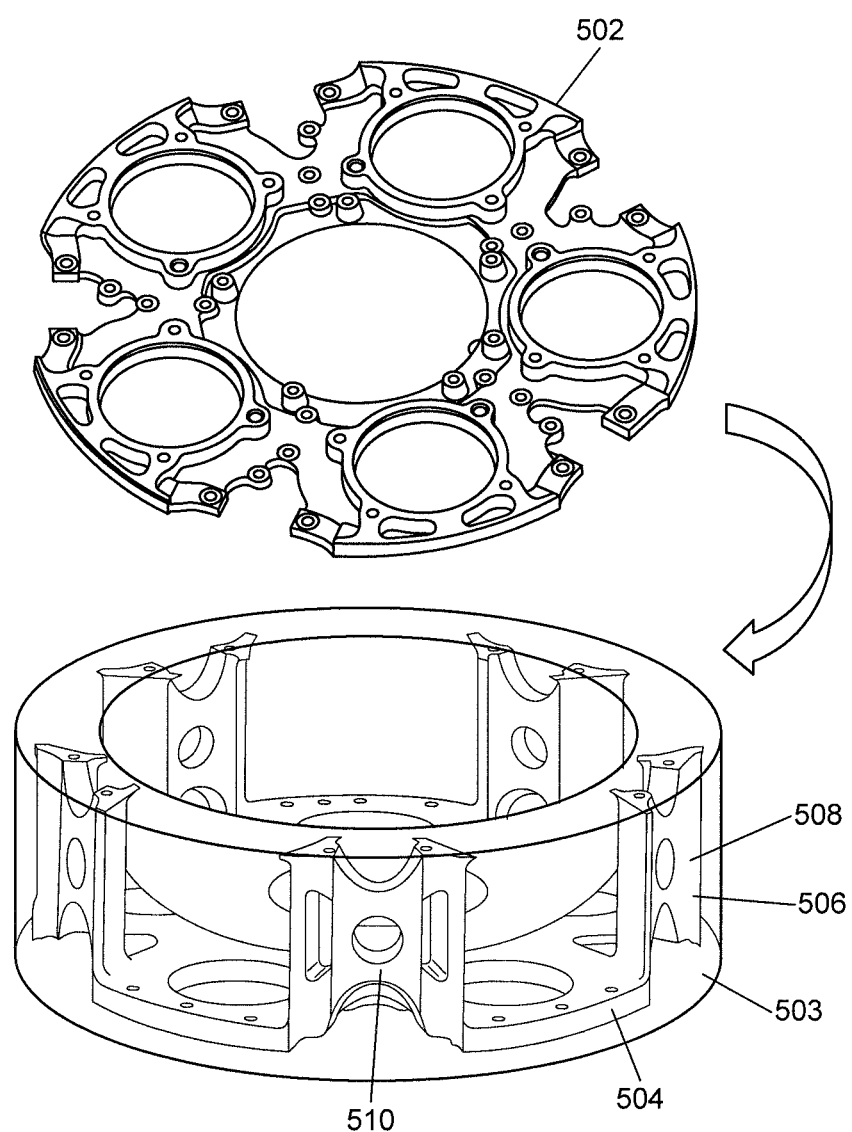
FIG. 5 is a perspective view of a partially constructed gear carrier, in accordance with various embodiments.

Turning to FIG. 5, a partially constructed gear carrier 500 is shown. Formation of gear carrier 500 may begin with formation of a first end plate 502 and a cylinder 503. First end plate 502 and/or cylinder 503 may be formed via forging or casting. After forging or casting, features of first end plate 502 may be machined. In various embodiments, various tolerant surfaces may not be machined at this time. For example, various tolerant surfaces may include surfaces and features that affect gear alignment or carrier attachment. Cylinder 503 may also be machined to form second end plate 504 and a plurality of connector plates 506 including a first connector plate 508 and a second connector plate 510. As with first end plate 502, features of second end plate 504 and connector plates 506 may be machined. In various embodiments, various tolerant surfaces may not be machined at this point.

After first end plate 502, second end plate 504 and connector plates 506 have been formed and machined, bushings may be used to connect first end plate 502 to connector plates 506. After connection of first end plate 502 to connector plates 506, the remaining machining of gear carrier 500, such as machining of various tolerant surfaces, may be completed. By forming gear carrier 500 in this manner, various tolerant surfaces may be formed with relatively high accuracy.

Figure 6:
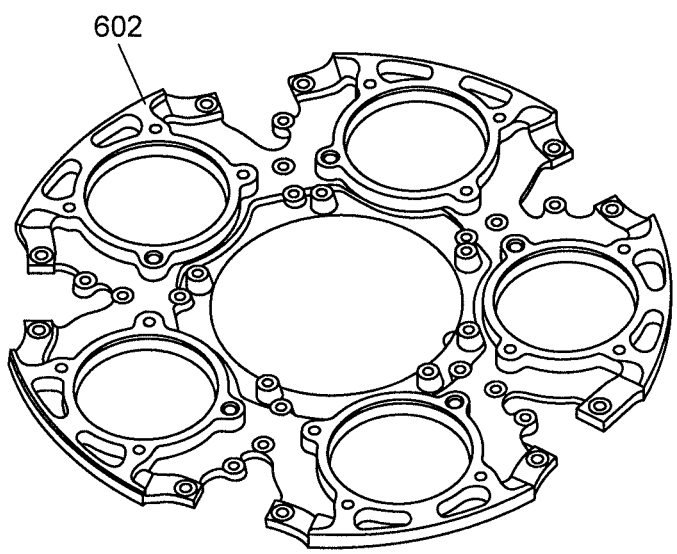
FIG. 6 is a perspective view of a partially constructed gear carrier, in accordance with various embodiments.
Figure 6:
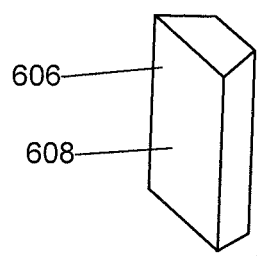
Figure 6:
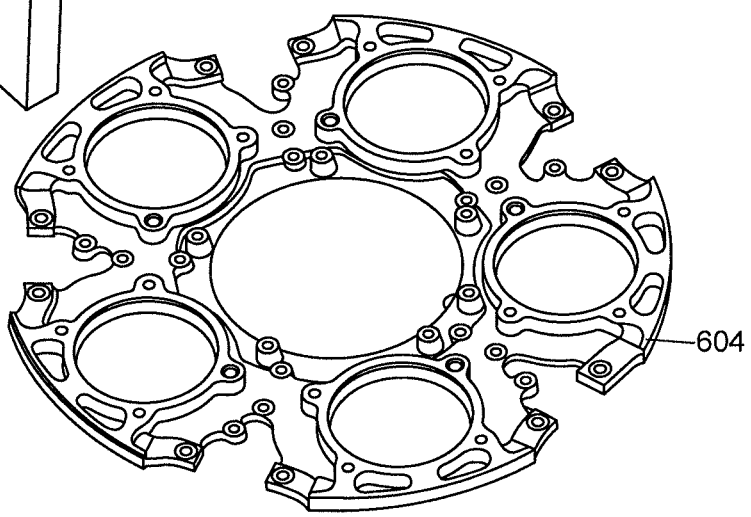

Turning now to FIG. 6, another partially constructed gear carrier 600 is shown. Formation of gear carrier 600 may begin with formation of a first end plate 602, a second end plate 604 and a plurality of connector plates 606 including a first connector plate 608. First end plate 602, second end plate 604 and connector plates 606 may be formed via forging or casting. After forging or casting, features of first end plate 602, second end plate 604 and connector plates 606 may be machined except for various tolerant surfaces.

After first end plate 602, second end plate 604 and connector plates 606 have been formed and machined, bushings may be used to connect first end plate 602 to connector plates 606 and additional bushings may be used to connect second end plate 604 to connector plates 606. After first end plate 602 and second end plate 604 have been connected to connector plates 606, the remaining machining of gear carrier 600 may be completed, such as machining of the various tolerant surfaces. By forming gear carrier 600 in this manner, various tolerant surfaces may be formed with relatively high accuracy.

Figure 7:
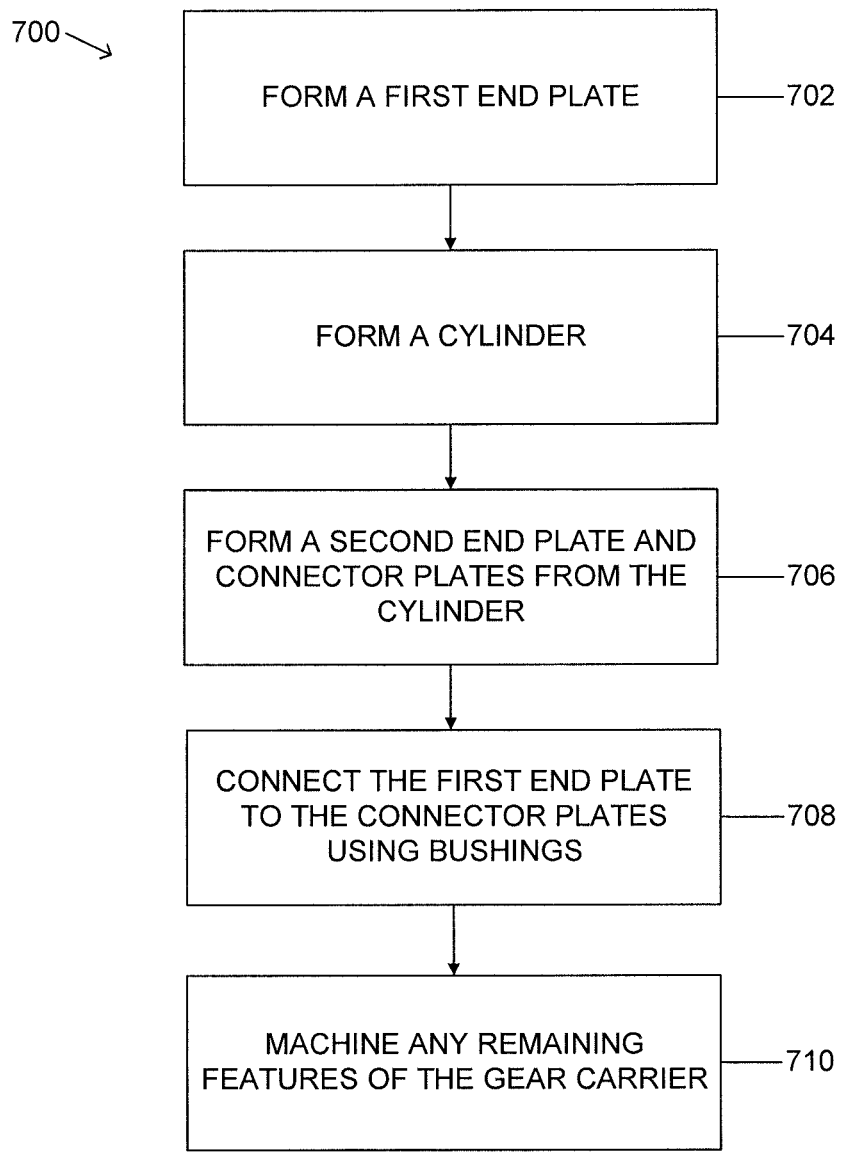
FIG. 7 is a flowchart illustrating a method for constructing a gear carrier using multiple components and at least one bushing, in accordance with various embodiments.

Turning now to FIG. 7, a method 700 for forming a gear carrier is shown. In block 702, a first end plate is formed via forging or casting. In various embodiments, the first end plate may be formed via another method. In various embodiments, at least some features of the first end plate may also be machined in block 702.

In block 704, a cylinder is formed via forging or casting. In various embodiments, the cylinder may be formed via another method. In block 706, a second end plate and one or more connector plates may be formed from the cylinder. For example, the second end plate and the connector plates may be formed via machining. In various embodiments, additional features of the second end plate and the connector plates may be machined in block 706.

In block 708, the first end plate may be connected to the connector plates using bushings. In various embodiments, a bolt may be inserted through a bolt aperture of each of the bushings and be received by bolt terminals of the connector plates. In block 710, any remaining features of the gear carrier may be machined after the first end plate has been connected to the connector plates.

Figure 8:
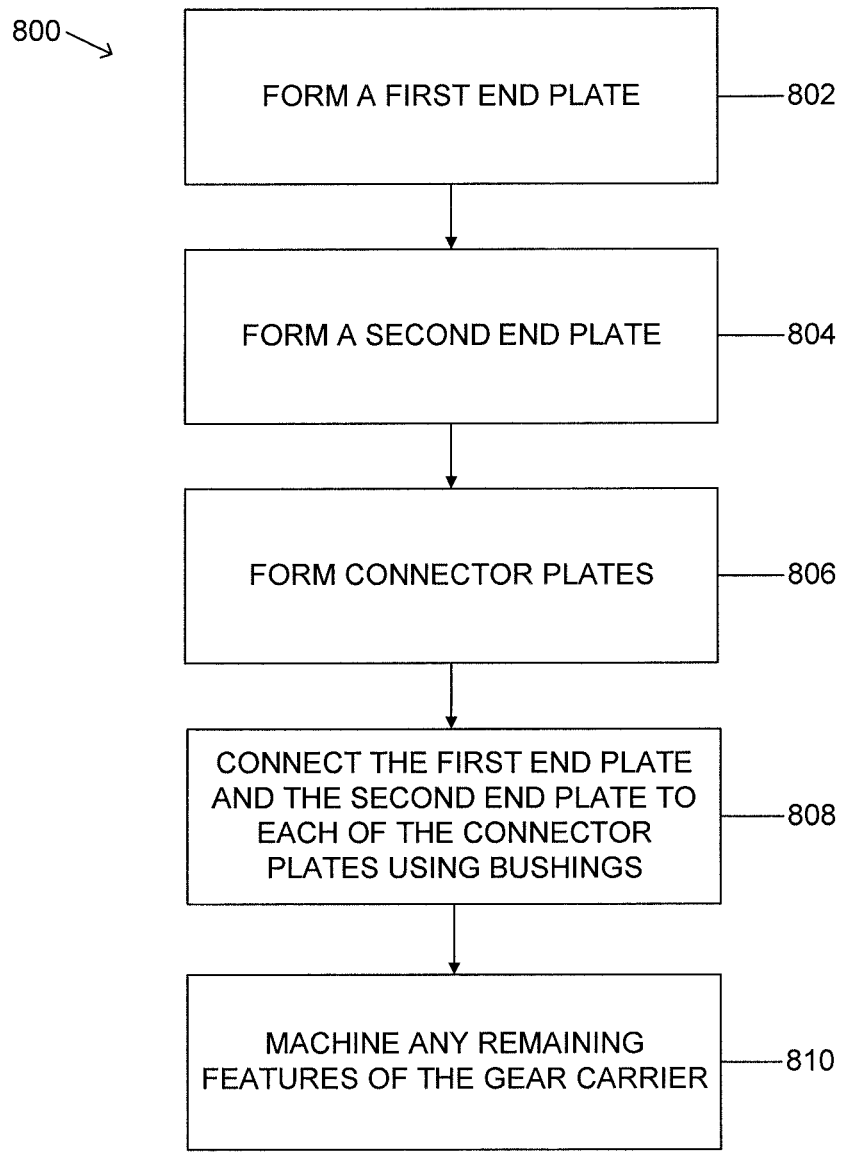
FIG. 8 is a flowchart illustrating another method for constructing a gear carrier using multiple components and at least one bushing, in accordance with various embodiments.

Turning now to FIG. 8, another method 800 for forming a gear carrier is shown. In block 802, a first end plate may be formed via casting or forging. In various embodiments, the first end plate may be formed via another method. In various embodiments, at least a portion of the features of the first end plate may also be machined in block 802.

In block 804, a second end plate may be formed via casting or forging. In various embodiments, the second end plate may be formed via another method. In various embodiments, at least a portion of features of the second end plate may also be machined in block 804.

In block 806, connector plates may be formed via casting or forging. In various embodiments, the connector plates may be formed via another method. In various embodiments, at least a portion of features of the connector plates may also be machined in block 806.

In block 808, the first end plate may be connected to each of the connector plates using bushings. Similarly, the second end plate may be connected to each of the connector plates using bushings. In various embodiments, a bolt may be inserted through a bolt aperture of each of the bushings and be received by bolt terminals of the connector plates.

In block 810, any remaining features of the gear carrier may be machined, such as various tolerant surfaces.

While the disclosure is described with reference to exemplary embodiments, it will be understood by those skilled in the art that various changes may be made and equivalents may be substituted without departing from the scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 u.s.c. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gear carrier, comprising:
    a first end plate;
    a connector plate;
    a second end plate connected to the connector plate; and
    a bushing configured to extend through the first end plate and into the connector plate to connect the first end plate to the connector plate,
    wherein the bushing is inserted through the first end plate and the connector plate while a temperature of the bushing is decreased and a temperature of the first end plate and the connector plate is increased.

2. The gear carrier of claim 1, further comprising a second bushing configured to extend through the second end plate and into the connector plate to connect the second end plate to the connector plate.

3. The gear carrier of claim 1, wherein the bushing has a first end that defines a collar and a second end that defines a chamfer.

4. The gear carrier of claim 3, wherein the first end plate defines a collar cavity configured to receive the collar of the bushing.

5. The gear carrier of claim 1, further comprising a bolt configured to extend through a bolt aperture of the bushing and be received by a bolt terminal of the connector plate for resisting movement of the bushing relative to the first end plate and the connector plate.

6. The gear carrier of claim 1, wherein the bushing extends for between about 0.25 inches and about 0.75 inches through the first end plate and extends for between about 0.25 inches and about 0.75 inches into the connector plate.

7. The gear carrier of claim 1, wherein the gear carrier is configured to be used in a gas turbine engine.

8. The gear carrier of claim 1, wherein the bushing includes at least one of titanium or steel.

9. A method for forming a gear carrier, comprising:
    forming a first end plate;
    forming a cylinder;
    forming a second end plate and a connector plate from the cylinder; and
    connecting the first end plate to the connector plate by increasing a temperature of the first end plate and the connector plate, decreasing a temperature of a bushing, and inserting the bushing through an end bushing aperture of the first end plate and a connector bushing aperture of the connector plate.

10. The method of claim 9, wherein forming the first end plate and forming the second end plate and the connector plate include machining various tolerance surfaces.

11. The method of claim 9, wherein forming the first end plate and forming the second end plate and the connector plate include at least one of casting or forging the first end plate and the second end plate and the connector plate.

12. The method of claim 9, further comprising machining any remaining features of the gear carrier after the first end plate is connected to the connector plate.

13. The method of claim 9, further comprising inserting a bolt through a bolt aperture of the bushing and screwing the bolt into a bolt terminal of the connector plate.

14. A method for forming a gear carrier, comprising:
    connecting a first end plate to a connector plate by increasing a temperature of the first end plate and the connector plate, decreasing a temperature of a first bushing, and inserting the first bushing through a first end bushing aperture of the first end plate and a first connector bushing aperture of the connector plate; and connecting a second end plate to the connector plate by inserting a second bushing through a second end bushing aperture of the second end plate and a second connector bushing aperture of the connector plate.

15. The method of claim 14, further comprising forming the first end plate, forming the second end plate and forming the connector plate by machining various tolerance surfaces.

16. The method of claim 14, further comprising forming the first end plate, forming the second end plate and forming the connector plate by at least one of casting or forging the first end plate, the second end plate and the connector plate.

17. The method of claim 14, further comprising machining any remaining features of the gear carrier after the first end plate and the second end plate are connected to the connector plate.

18. The method of claim 14, further comprising inserting a bolt through a bolt aperture of the first bushing and screwing the bolt into a bolt terminal of the connector plate.

* * * * *